United States Patent [19]
Barrett

[11] 3,935,947
[45] Feb. 3, 1976

[54] MAGNETIC REFUSE SEPARATOR
[75] Inventor: William T. Barrett, Waukesha, Wis.
[73] Assignee: Wehr Corporation, Milwaukee, Wis.
[22] Filed: Feb. 20, 1974
[21] Appl. No.: 443,953

[52] U.S. Cl. ........... 209/111.8; 209/223 A; 198/198
[51] Int. Cl.² ......................................... B07C 5/344
[58] Field of Search ........... 209/81 A, 111.8, 223 A, 209/223 R, 224; 198/198, 199, 4, 174

[56] References Cited
UNITED STATES PATENTS

| 905,815 | 12/1908 | Gröndal | 209/223 A |
|---|---|---|---|
| 972,109 | 10/1910 | Holmberg | 209/223 A |
| 1,146,141 | 7/1915 | Dutton | 209/223 A |
| 1,590,884 | 6/1926 | Bryant | 198/199 |
| 2,303,587 | 12/1942 | Snyder | 198/199 |
| 3,809,239 | 5/1974 | Barrett et al. | 209/111.8 |

Primary Examiner—Allen N. Knowles

[57] ABSTRACT

A magnetic separator includes a continuous belt revolving in a closed path in association with a supply conveyor carrying magnetic and non-magnetic refuse. A magnetic assembly at the belt includes, in the direction of belt travel, a pick-up magnet, a transfer magnet, and a discharge magnet. A curve is provided in the path of belt travel, other than at its head or end pulley, and the magnetic field is generated upstream and downstream of the belt curve and at the curve. The field from the pick-up magnet extends along the belt to the belt curve, the field from the transfer magnet is at the curve, and the discharge magnet is on the opposite side of the curve spaced from the transfer magnet to provide a gap in the magnetic field between the transfer and discharge magnet. Magnetic material from the burden on the supply conveyor is attracted to the belt and non-magnetic material falls away. The magnetic material so attracted travels with the belt into the gap in the magnetic field at which point it is released and falls away from the belt. The released magnetic material follows a trajectory which carries it into the field of the discharge magnet where it is again attracted to the belt. This release and re-attraction movement tends to dislodge any non-magnetic material initially drawn to the belt with the magnetics. In the area of the discharge magnet the magnetic material is moved completely out of the magnetic field whereupon it falls away from the belt for collection. The discharge magnet is adjustable relative to the transfer magnet in the direction of belt travel to vary the length of the gap.

The conveyor belt includes a plurality of cleats projecting from the belt surface and spaced along the belt length. Replaceable wear pads are attached to the belt surface and to the cleat surfaces facing in the direction of belt travel.

14 Claims, 5 Drawing Figures

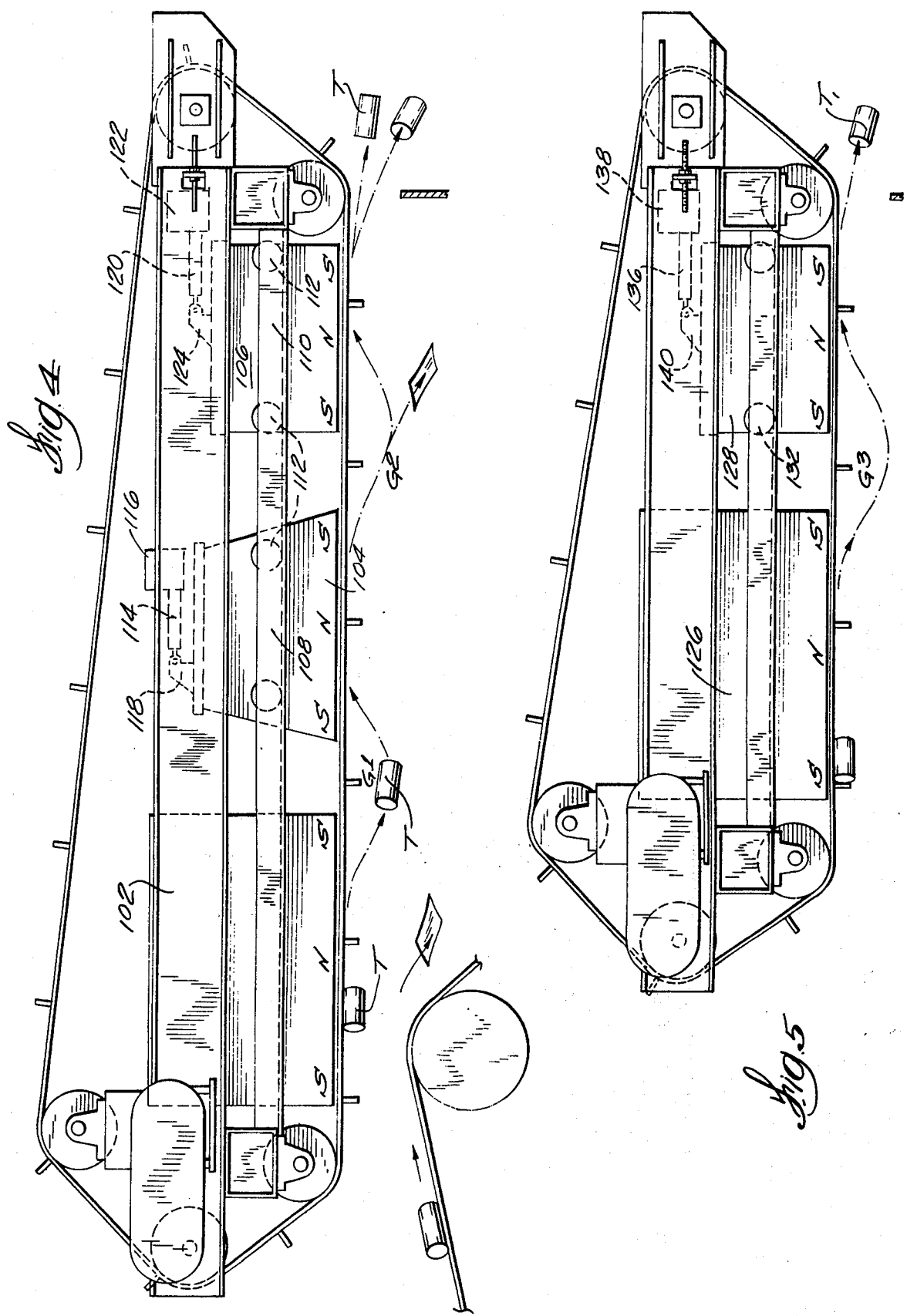

MAGNETIC REFUSE SEPARATOR

BACKGROUND OF INVENTION

This invention relates to magnetic separators and, more particularly, to magnetic separation of magnetic material in refuse.

With more and more emphasis being placed on recycling, it is becoming more desirable to recover salvageable articles from otherwise discarded material. Much of the metallic material discarded as refuse can generally be recycled for one purpose or another, provided it can be efficiently separated from the remainder of the refuse. The portions intended to be recaptured being metallic are generally also magnetic so that magnetic separation is a possibility for recapture. However, the remainder of the refuse, i.e. other than thet metallic articles, although generally not magnetic (e.g. paper), is usually light and tangled with the magnetic portions and thus subject to being carried along with the magnetic material making complete separation difficult, if not impossible. Also, in some cases it may be desired to separate the lighter material (e.g. paper) for recycling.

There are various designs of magnetic separators, none of which, to the inventor's knowledge, are well suited to this refuse separator problem because of an inability to insure thorough separation of magnetics from non-magnetics in that environment.

This invention is concerned with this problem and has as one of its objects the provision of effective separation of the magnetic portions of refuse from the non-magnetic portions thereof.

Another general object of this invention to account for is belt wear.

A patent filed by Newton I. Potter and William T. Barrett U.S. Pat. No. 3,809,239 entitled "Magnetic Refuse Separator", and assigned to the assignee of this application, discloses and claims a magnetic separator which is also concerned with the problem of refuse separation.

SUMMARY OF THE INVENTION

For the achievement of these and other objects, this invention proposes a magnetic separator having a continuous belt moving through a magnetic field generated by a magnetic assembly. A gap is provided in the magnetic field so that magnetic material initially attracted to, and moving with, the belt is released at the gap, falls away from the belt, and then is re-attracted to the belt as it (the magnetic material) moves past the gap. This temporary release of the magnetic material agitates the material traveling with the belt to dislodge any non-magnetics being carried along with the magnetics. The magnetic field is generated by at least two separate magnetic assemblies, one of which is adjustable relative to the other to vary the length of the gap in the magnetic field.

In a preferred embodiment the belt is supported such that it has a curve in its path and the magnetic field is generated on both sides of the curve. Material attracted to the belt must negotiate the curve and some displacement, and thus agitation, will occur at the curve. Also, agitation is further enhanced by the magnetic assembly presenting alternating polarities to the belt and thus to the material attracted thereto.

Preferably, the belt on both of the upstream and downstream sides of the curve is disposed at an angle to the horizontal thereby taking better advantage of gravity, with the agitation, to achieve complete separation.

Also, in a preferred embodiment, replaceable wear pads made of generally flexible material are attached to the surface of the conveyor belt in the area most susceptible to wear. The belt is provided with cleats and removable wear pads are also attached to the cleat surfaces which are most susceptible to wear.

DESCRIPTION OF THE DRAWINGS

FIGS. 4 and 5 illustrate alternative embodiments.

DESCRIPTION OF THE PREFERRED EMBODIMENT

Figure 1:
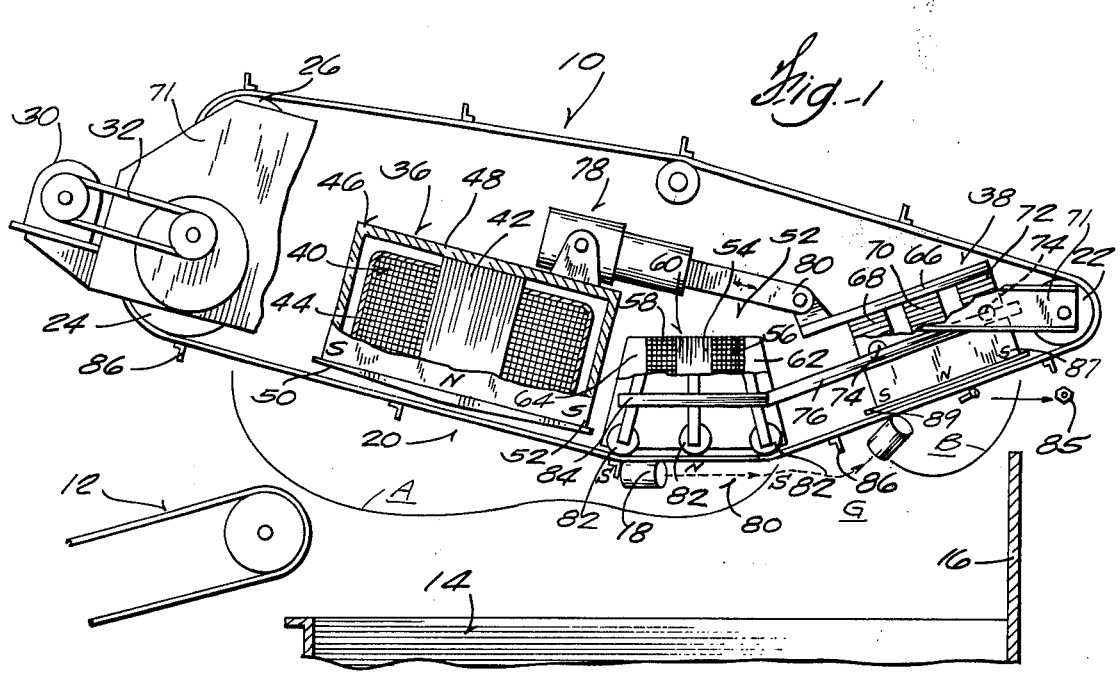
FIG. 1 is a side view of a combination supply conveyor and refuse separator partially in section.

With particular reference to the drawings, a refuse separator 10 is illustrated in combination with a supply conveyor 12, receptacle 14 and a splitter baffle 16. The function of the receptacle and splitter baffle is to physically segregate separated magnetic and non-magnetic material, therefore no particular form of either is necessary. As will be discussed hereinafter, however, the location of the splitter is a factor to be considered in operation.

The refuse separator is intended to receive burden from supply conveyor 12 and carry the magnetic portion of the burden over splitter baffle 16 while the non-magnetic material falls, by reason of gravity, into receptable 14. To this end, the separator includes belt 20 which travels in a counterclockwise manner around head and end pulleys 22 and 24 and idler roller 26 and has upper and lower generally horizontal extensions. Head pulley 24 is connected to drive motor 30 through a belt drive 32 so that the belt 20 is driven by the head pulley. In this manner, the belt travels in a continuous, closed path under the influence of drive pulley 24.

A magnetic arrangement is located within the area defined by belt 20 and includes a lead or pick-up magnet assembly 36 and a trailing or discharge magnet assembly 38 downstream of the lead magnet. The pick-up magnet 36 is in the form of an electromagnet 40 having a central core 42 surrounded by an electrical coil 44 and enclosed in housing 46 which is U-shaped in cross section. Core 42 engages the rear wall 48 of the housing which also functions as a magnetic backplate. This is a conventional electromagnet construction and when coil 44 is energized the end of core 42 adjacent belt 20 will assume one magnetic polarity, e.g. north, and the outer ends of housing sides 50 and 52 of the housing will assume an opposite magnetic polarity, south. This will be referred to as the pick-up magnet.

Immediately downstream of the pick-up magnet 40 is a transfer magnet assembly 52, also in the form of an electromagnet including a core 54 surrounded by coil 56 and engaging rear wall 58 of housing 60. Rear wall 58 provides a backplate connecting core 54 magnetically with housing sides 62 and 64. When coil 56 is energized the core is magnetized and its outer end and the outer ends of sides 62 and 64 assume different magnetic polarities, north and south, respectively, as illustrated. This will be referred to as the transfer magnet.

Trailing magnetic assembly 38 is located further downstream and consists of a backplate 66 and three permanent magnetic stacks 68, 70, and 72 projecting from the backplate 66 toward the belt. Each of the magnetic stacks can be made of permanent magnetic material such as barium titanate waffers, which are magnetized through their thickness dimension. i.e. at right angles to backplate 66, and stacked with the thickness dimension of each magnetic waffer in a stack 68, 70, or 72 extending in a common direction. By controlling the orientation of the magnetic waffers the magnetic polarity presented to the belt by each of the magnetic stacks can be controlled so that, for example, a north magnetic polarity is presented by each of stacks 68 and 72 and a south magnetic polarity is presented by stack 70. It will be noted that alternating polarity is maintained through the pick-up, transfer, and discharge magnetic assembly and the adjacent poles of transfer magnet 36 and discharge magnet 38 (side 62 and stack 68) present the same magnetic polarity to the belt. This will be referred to as the discharge magnet.

Presenting alternating magnetic polarities to the material attracted to the belt, either in the manner illustrated or otherwise, causes that material to roll around on the belt as it is being carried through the field. This agitation contributes to effective separation.

It will be appreciated further that the entire magnetic assembly could be made of electromagnets or permanent magnets as desired or as illustrated it can be a combination of permanent and electro. Electromagnets do afford a possible safety advantage when work must be done in the area of the separator in that they can be turned off and cleared of all material.

The idler roller and pulleys and head pulley 24 together with the magnetic assembly are all supported from a common frame structure 71, a portion of which is illustrated in FIG. 1. A complete showing of the structural framework of the refuse separator is not necessary to an understanding of this invention and a general description of the support structure is believed to be adequate. Also, the entire separator assembly can be mounted for horizontal movement to permit adjustment of its position relative to the end of conveyor 12. The details of this mounting and adjustment are not shown, if such details are desired reference may be had to the aforementioned co-pending application.

With reference to FIG. 1, the magnetic field generated by the overall magnet arrangement is illustrated by lines A and B which depict the field pattern. Preferably, the flux concentration and depth of field is greatest at pick-up magnet 40 thereby placing the strongest field at the discharge point of conveyor 12 where the greatest attractive force is required. The strength of the field, flux concentration and depth of field, is lesser in the area of transfer magnet 52 and discharge magnet 38 but is substantially equal as between those two areas. It will be noted that discharge magnet 38 is spaced from transfer magnet 52 relative to the direction of belt travel. This spacing creates a gap, area G, in the magnetic field. As illustrated, gap G is shown as being completely free of flux. In practice, there may be some leakage flux in the gap but it is still a gap in the field in that, in the gap, the attractive force tending to hold magnetic material on the belt is virtually zero. Therefore, reference to a gap in the magnetic field is used in the sense of zero flux or an inconsequential amount of stray flux being in the area, i.e. inconsequential in the sense that there is insufficient force acting on magnetic material in the gap to hold it onto the belt. Arranging magnets 52 and 38 as illustrated, i.e. like poles adjacent each other contributes to providing a relatively flux-free gap. The flux from the adjacent south poles will tend to have a magnetic repelling effect reducing the stray flux in the gap; however, unlike poles could be placed adjacent each other.

In operation, conveyor 12 carries burden into the magnetic field and the magnetic material contained in the burden is attracted to the belt 20 in the area of pick-up magnet 40. The non-magnetic material such as paper, will fall by gravity into receptacle 14 and the magnetic material travels with belt 20 beyond splitter 16 where it is discharged on the side of the splitter baffle opposite to the receptacle. To take advantage of the fact that once the magnetics are attracted to the belt less magnetic force is required to hold them on the belt than to attract them initially, the magnet assemblies can be made to diminish in strength from pick-up magnet 40 through the discharge magnet 38. However, the fields need not always diminish in strength in this manner as the deeper fields resulting of greater strength permit higher belt speeds which in some installations may be advantageous. For example, where industrial waste is being handled, a stronger discharge magnet may be desirable, i.e. perhaps stronger than the transfer magnet.

Paper and like non-magnetic material, being relatively light, is prone to being tangled with the magnetic material and carried along with it into engagement with belt 20 such that it cannot fall into receptacle 14. To provide means for dislodging this entrapped non-magnetic material, this invention intends to provide agitation of the burden carried by belt 20 without losing the magnetic material. One means of achieving this agitation has already been mentioned, i.e. a field of alternating polarity. Agitation is also achieved by providing the gap G in the magnetic field and this has been found to be most effective in producing separation. More specifically, a can C, for example, is initially attracted to belt 20 in the area of pick-up magnet 40. The can moves with the belt past transfer magnet 52. Having passed the transfer magnet, the can leaves the field of the magnet, i.e. line A, and enters gap G. Since there is no attractive force in the gap holding the can on the belt, it will fall away due to gravity. But, because the can is traveling at belt speed when it starts to fall, it follows a trajectory illustrated by the dotted line. The can will separate from the belt but will not fall vertically a sufficient amount to pass outside of the field of discharge magnet 38. On the contrary, it will travel into field B whereupon it is again attracted to the belt for movement therewith. The can having separated from the belt, any paper or other non-magnetic material, which may have been pinched between the can and the belt, will be freed and drops into bin 14. It has been noted that the magnetic material, in many instances, tumbles as it passes through the gap and this further enhances freeing of non-magnetics. The can, or whatever magnetic article is involved, is ultimately dropped over the splitter 16 as described above.

Preferably, discharge magnet 38 is supported by rollers 74 connected to opposite sides of the magnet (only one side being illustrated) and engaging rails 76 which are part of the separator frame. The rails can be sections of conventional angle iron. An actuator 78 extends between pick-up magnet 40 and discharge magnet 38 and can be a conventional double acting hydraulic or pneumatic cylinder, or an electromechanical device. Operation of actuator 78 will either extend or retract rod 80 to move magnet 38 toward or away from magnet 52 to vary the length of gap G. Thus, the gap length is adjustable and the speed of the belt can be regulated by controlling the speed of motor 30 so that the different types or mix of refuse can be accommodated by regulating belt speed and adjusting gap length accordingly.

It will be readily appreciated that the distance between the transfer and discharge magnets, and correspondingly the gap length, is important to the effective separation. If too small, the metallic articles will not part from the belt and that agitation is lost. If too large, the metallic articles will be lost and re-attracted to the belt to be carried over the splitter 16. Other factors which must be considered are belt speed and gauss levels relative to the belt travel and also relative to each as between the pickup, transfer, and discharge magnets. Splitter position must also be considered, its horizontal location relative to the discharge magnet and its vertical position relative to the belt.

Excellent results have been achieved with normal municipal type refuse using a separator having a 60 inch wide belt and an overall separator length (drive to trailing pulley) of approximately 200 inches. The distance between the transfer and discharge magnets (the gap) was set at 5.75 inches, the belt speed at approximately 375 fpm and at approximate gauss levels of from 1050–1300, 440–550, 370–460 for the pick-up, transfer, and discharge magnets, respectively. It will be appreciated, that these are examples of the parameters to be considered in an installation and their relative values. Gap distances from 5½ inches up to 12 inches given satisfactory results, it being appreciated that the other discussed parameters also have to be considered.

As alluded to above splitter position must also be considered. For example, in an installation along the parameters just discussed, but with the discharge magnet and the lower belt extension at the discharge magnet horizontal, the splitter was spaced, relative to trailing edge 87 of the discharge magnet, toward leading edge 89 3 inches horizontally and vertically 21½ inches below the belt. The splitter may have to be moved if the orientation of the discharge magnet is changed to that illustrated in FIG. 1, e.g. lowered and possibly moved to a position below trailing edge 87. Belt speed and the strength of the discharge magnet also have an effect on the final position of the splitter, as these factors determine the trajectory of metallic material leaving the belt at the discharge magnet. In this respect it may be advantageous that the discharge magnet be in the form of an electromagnet of the same construction as the pickup magnet. The strength of the electromagnet at the discharge position can be controlled by connecting a conventional rheostat in the electrical circuit of the energizing coil of the electromagnet.

In the illustrated preferred embodiment the material attracted to the belt is further agitated by virtue of a curve 80 in the lower portion of the path of belt 20. The curve is provided at transfer magnet 52. With respect to the direction of travel of belt 20, the pick-up magnet is located upstream of curve 80 and the discharge magnet is located downstream of the curve. Material adhered to the belt must change direction at the curve and since the non-magnetic material does not have the magnetic attractive force to hold it on the belt, it tends, due to centrifugal force, to proceed in a straight line trajectory rather than make the curve. Also, it has been observed that, again due to centrifugal force, some physical separation of the magnetic material from the belt may occur at the curve but not completely from the magnetic field so that the magnetic material returns to the belt after the curve has been negotiated this causes agitation of the curve which further tends to dislodge the non-magnetic material.

Also, the preferred embodiment illustrated in FIG. 1 shows the upstream and downstream portions of the belt adjacent curve 80 both positioned at an angle to a horizontal plane, this arrangement makes maximum use of the force of gravity in separating the non-magnetics. This is, the turn at the curve utilized basic inertia and gravity to achieve some separation and the belt proceeding generally upward from the curve making most effective use of the pull of gravity on the non-magnetic material to enhance separation.

The alternating magnetic polarities along the path of travel of the belt provides agitation and further enhances separation. The magnetics being forced to pass through alternately different magnetic fields will, in effect, roll around and not hold a stationary position on the belt.

A number of idler rollers 82 are supported from frame work 84 at curve 80. Three such rollers being provided on each side of magnet assembly 52 so that the magnet actually overlies only the central position of the belt. The rollers are made of non-magnetic stainless steel and are capable of limited movement both vertical and horizontal.

It has been observed that in use, the refuse attracted to belt 20 tends to accumulate in the center of conveyor belt 20. It is believed that this is a natural tendency and also is possibly a result of the fact that core 42 of the initial attracting magnet is centered on the belt. In any event, as a result of this location of the attractive material on the belt, there is a tendency for a high degree of wear in the central portion of the belt and the preferred embodiment of this invention proposes an arrangement recognizing this wear problem.

Figure 3:
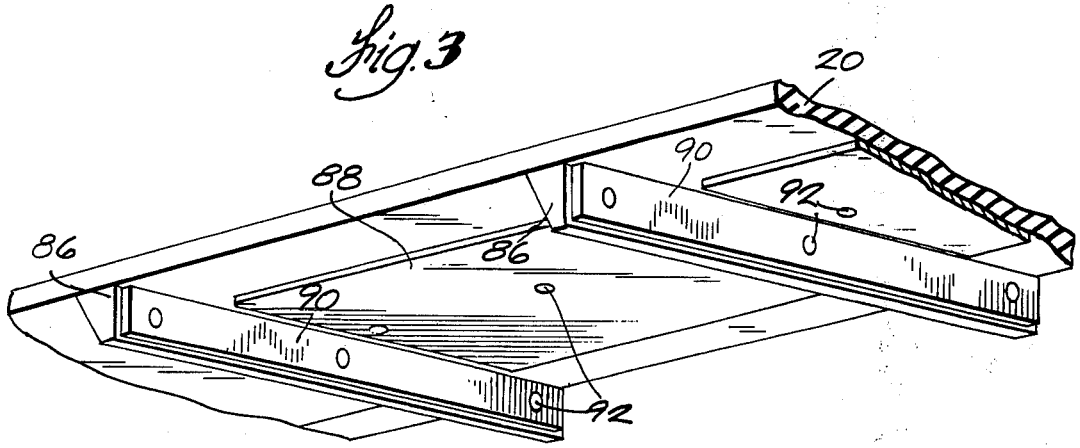
FIG. 3 is a perspective of a portion of the separator belt.

With reference to FIG. 3, belt 20 is provided with a series of replaceable wear pads 88 which are attached to the outer surface of the belt. The wear pads are made of a suitable, generally flexible material such as polyurethane.

As is conventional practice, belt 20 is provided with a series of cleats 86 which project from the outer surface of the belt generally at right angles to the belt and extend across the belt perpendicular to the longitudinal axis of the belt. These cleats are generally made of the same material as the belt and are attached to the belt in a conventional manner (not shown). As illustrated, a wear pad 84 is bolted to the belt between each adjacent pairs of cleats. More specifically, a number of holes are provided in the belt between the cleats and the wear pads is positioned on the belt with an identical number of holes registered with the holes in the belt. Nuts and bolts 85 of non-magnetic material are used to affix the wear pads to the belt surface.

The wear pads are positioned in the center of the belt, more specifically, approximately the central ⅓ of the belt. With this arrangement the refuse will tend to accumulate on the wear pads so that the pads take the wear and the basic belt is relatively wear-free. When the pads have worn they are readily removed and replaced by new pads.

As is will known, in normal operation material attracted to the belt at magnet 40 is generally held by the magnet such that it resists movement with the belt. For this reason cleats 86 are provided. The cleats periodically come along and move material which would otherwise remain generally in the area of magnet 40 in the direction of the belt's travel. Therefore, the forwardly facing surface of the cleats, i.e. forwardly with respect to the direction of travel of the belt, are also a source of potential wear. To counteract this problem, wear plates 90 are attached to that face of the cleat. In this case the wear plates can be made of stainless steel since, unlike pads 84, they do not have to bend to go around the pulleys and again are connected to the cleats by bolts 92 which pass through registering holes in the wear plates 90 and each cleat 86 to provide a readily replaceable wear plate on the cleats which can be removed when worn.

Other magnet orientations and arrangements are possible and some examples are illustrated in FIGS. 4 and 5.

Figure 2:
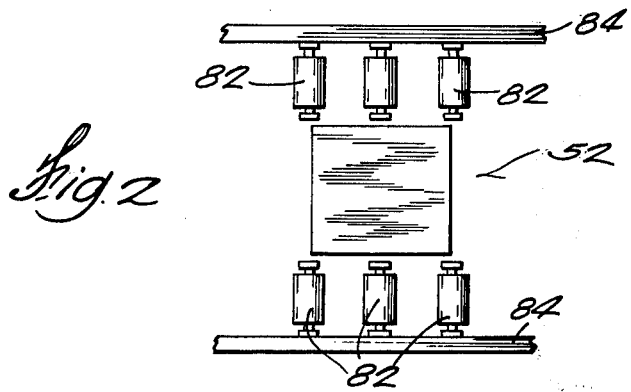
FIG. 2 is a bottom view of a part of the refuse separator of FIG. 1 with the belt removed.

In FIGS. 4 and 5 the basic structure of the separators (i.e. drive, belt, frame pulleys) are virtually the same as that of the separator of FIGS. 1–3.

One immediately discernable difference is the elimination of the curve from the lower portion of the belt path. In some applications it has been found that the agitation resulting from the gap, with or without the alternating field pattern, is sufficient to achieve acceptable separation.

In FIG. 4, pick-up magnet 100 is fixed relative to separator frame 102. Both transfer magnet 104 and discharge magnet 106 are supported on rails 108 and 110, which are part of the overall frame, by rollers 112. Actuator 114 extends between brackets 116 and 118 attached to the frame and the transfer magnet, respectively. Operation of actuator moves transfer magnet 104 toward and away from pick-up magnet 100. Actuator 120 extends between brackets 122 and 124 attached to the frame and discharge magnet 106, respectively. Operation of actuator 120 moves the discharge magnet toward and away from transfer magnet 104. This provides virtually flux free G1 and G2 in the magnetic field generated by the magnetic assemblies. The path of a tin can T (representative of the magnetic portion of the refuse being delivered to the separator) is illustrated, the can following a generally undulating path and separation thereof from the belt at the gaps providing the necessary agitation.

In FIG. 5, the separator includes only two magnet assemblies, pick-up magnet 126 and a downstream magnet 128 which can be viewed as the discharge magnet. The pick-up magnet is fixed to frame 130 whereas magnet 128 is supported for movement relative to the frame and the pick-up magnet by rollers 132 engaged upon rails 134, again the rails being part of the frame. Actuator 136 extends between brackets 138 and 140 connected to the frame and discharge magnet, respectively. Operation of the actuator moves the discharge magnet toward and away from pick-up magnet. This again provides an adjustable gap G3 and the path of the tin can T1 is illustrated in association with the magnetic assembly. In this alternative one separation of the magnetic material from the belt occurs.

The supply conveyor and splitter can be arranged relative to the separator the same as discussed in connection with FIGS. 1–3.

Although but one embodiment of the present invention has been illustrated and described, it will be apparent to those skilled in the art that various changes and modifications may be made therein without departing from the spirit of the invention or from the scope of the appended claims.

I claim:

1. A magnetic separator comprising, in combination, a belt,
means supporting said belt for movement around a closed path in continuous fashion, said path having upper and lower horizontal extensions,
a magnetic assembly supported adjacent said belt along a portion of the lower horizontal extension of said closed path to generate a magnetic field through which said belt moves,
means for moving said belt along said path,
and said magnetic assembly including a first magnetic field generating portion and a second magnetic field generating portion spaced a predetermined distance from said first field generating portion of the direction of the path of travel of said belt to provide a gap in the magnetic field generated by said magnetic assembly between said first and second field generating portions so that magnetic articles attracted to said belt in the area of said first field generating portion are released in said gap and fall away from said belt, the length of such gap being such that, together with the momentum imparted to said magnetic articles by the movement of said belt, said magnetic articles fall along a trajectory such that they are directed into the magnetic field generated by said second field generating portion and again attracted to said belt in the area of said second field generating portion and non-magnetics carried by said magnetic articles to said belt in the area of said first magnetic portion are dislodged in said gap and are thereby separated from said belt.

2. The magnetic separator of claim 1 wherein said means supporting said belt further supports said belt to define a curve in the lower horizontal extension of said closed path,
and, relative to the direction of travel of said belt, said first generating portion is located upstream of and extends to said curve and said second field generating portion is located downstream of said curve.

3. The magnetic separator of claim 1
wherein said magnetic assembly includes a pick-up magnet, a transfer magnet, and a discharge magnet arranged, relative to the direction of travel of said belt with said discharge magnet downstream of said pick-up magnet and with said transfer magnet between said pick-up and discharge magnets,
and wherein said discharge magnet is spaced from said transfer magnet to provide said gap.

4. A magnetic separator comprising, in combination, a working member,
means supporting said working member for movement along a defined path,
means for moving said working member along said path,
a magnetic assembly supported adjacent said working member to generate a magnetic field through which said working member moves,
and said magnetic assembly including first and second magnetic field generating portions relatively spaced apart a predetermined distance in the direction of the path of travel of said working member to provide a magnetic field with a gap in the field between said first and second field generating portions so that magnetic articles attracted to said working member in the area of first field generating portion are released in said gap and fall away from said working member in the area of said gap, the length of such gap being such that, together with the momentum imparted to said magnetic articles by the movement of said belt, said magnetic articles fall along a trajectory such that they are directed into the magnetic field generated by said second field generating portion and are again attracted to said working member in the area of said second field generating portion and non-magnetics carried by said magnetic articles to said belt in the area of said first field generating portion are dislodged in said gap and are thereby separated from said belt.

5. In a magnetic separator including a belt having inner and outer surfaces, means for moving said belt along a defined path and a magnetic assembly supported adjacent said belt at the inner surface thereof to generate a magnetic field through which said belt moves, the improvement comprising
   a plurality of flexible wear pads,
   means releasably connecting said wear pads to the outer surface of said belt generally in the central portion of said belt,
   a plurality of cleats between adjacent wear pads and spaced along said belt in the direction of travel thereof, said cleats projecting outwardly from said belt and extending across said belt generally perpendicular to the direction of belt travel.
   each of said flexible wear pads being of such area as to substantially cover the belt area between adjacent cleats,
   a plurality of second wear pads positioned one at the surface of each of said cleats which faces in the direction of travel of said belt,
   and means providing a releasable connection of said wear pads to said cleats.

6. A magnetic separator comprising, in combination, a belt,
   means supporting said belt for movement around a closed path in continuous fashion, said path having upper and lower horizontal extensions,
   means for moving said belt along said path,
   a magnetic assembly supported adjacent said belt along a portion of the lower horizontal extension of said closed path to generate a magnetic field through which said belt moves,
   said magnetic assembly including a first magnetic field generating portion and a second magnetic field generating portion spaced from said first field generating portion in the direction of the path of travel of said belt providing a gap in the magnetic field generated by said magnetic assembly between said first and second field generating portions so that the magnetic articles attracted to said belt in the area of first field generating portion are released in said gap and fall away from said belt and are again attracted to said belt in the area of said second field generating portion,
   means supporting one of said first and second field generating portions for movement in the direction of belt travel toward and away from the other of said first and second field generating portions,
   and operating means connected to and operative to move said one of said first and second field generating portions toward and away from the other of said first and second field generating portions.

7. The magnetic separator of claim 6 wherein
   said means supporting said belt further supports said belt to define a curve in the lower horizontal extension of said closed path,
   and, relative to the direction of travel of said belt, said first field generating portion is located upstream of and extends to said curve and said second field generating portion is located downstream of said curve.

8. A magnetic separator comprising, in combination, a belt,
   means supporting said belt for movement around a closed path in continuous fashion, said path having upper and lower horizontal extensions,
   means for moving said belt along said path,
   a magnetic assembly supported adjacent said belt along a portion of the lower horizontal extention of said closed path to generate a magnetic field through which said belt moves,
   said magnetic assembly including a first magnetic field generating portion and a second magnetic field generating portion spaced from said first field generating portion in the direction of the path of travel of said belt providing a gap in the magnetic field generated by said magnetic assembly between said first and second field generating portions so that magnetic articles attracted to said belt in the area of first field generating portion are released in said gap and fall away from said belt and are again attracted to said belt in the area of said second field generating portion,
   and generally flexible wear pads positioned at the outer surface of said belt and means releasably connecting said wear pads to said belt.

9. The magnetic separator of claim 8
   wherein said belt includes a plurality of cleats spaced along said belt in the direction of travel thereof, and cleats projecting outwardly from said belt and extending across said belt generally perpendicular to the direction of belt travel,
   a wear pad positioned at the surface of each of said cleats which faces in the direction of travel of said belt,
   and means providing a releasable connection of said wear pads to said cleats.

10. The magnetic separator of claim 8 wherein the wear pads attached to said belt surface are located generally in the central portion of said belt.

11. A magnetic separator comprising, in combination,
    a belt,
    means supporting said belt for movement around a closed path in continuous fashion, said path having upper and lower horizontal extensions,
    means for moving said belt along said path,
    a magnetic assembly supported adjacent said belt along a portion of the lower horizontal extension of said closed path to generate a magnetic field through which said belt moves,
    said magnetic assembly including a first magnetic field generating portion and a second magnetic field generating portion spaced from said first field generating portion in the direction of the path of travel of said belt providing a gap in the magnetic field generated by said magnetic assembly between said first and second field generating portions so that magnetic articles attracted to said belt in the area of first field generating portion are released in said gap and fall away from said belt and are again attracted to said belt in the area of said second field generating portion, a supply conveyor for delivering a burden consisting of magnetic and non-magnetic material to said belt in the area of the magnetic field generated by said first field generating portion, means for supporting said magnetic separator over a receptacle into which non-magnetic material falls, and a splitter baffle located in the area of the downstream end of said second field generating portion so that magnetic material attracted to said belt travels with said belt up to said splitter baffle after which it leaves said magnetic field and falls from said belt.

12. A magnetic separator comprising, in combination, a belt, means supporting said belt for movement around a closed path in continuous fashion, said path having upper and lower horizontal extensions, means for moving said belt along said path, a magnetic assembly supported adjacent said belt along a portion of the lower horizontal extension of said closed path to generate a magnetic field through which said belt moves, said magnetic assembly including a pick-up magnet, a transfer magnet, and a discharge magnet arranged, relative to the direction of travel of said belt, with said discharge magnet downstream of said pick-up magnet and with said transfer magnet between said pick-up and discharge magnets, said discharge magnet being spaced from said transfer magnet in the direction of travel of said belt to provide a gap in the magnetic field generated by said magnetic assembly between said transfer and discharge magnets so that magnetic articles attracted to said belt in the area of said pick-up magnet are released in said gap and fall away from said belt and are again attracted to said belt in the area of said discharge magnet, and means connected to said dishcarge magnet and operative to move said discharge magnet toward and away from said transfer magnet to vary the size of said gap.

13. The magnetic separator of claim 12 wherein said means supporting said belt further supports said belt to define a curve in the lower horizontal extension of said closed path, and, relative to the direction of travel of said belt, said pick-up magnet is located upstream of said curve, said discharge magnet is located downstream of said curve, and said transfer magnet is located at said curve.

14. The magnetic separator of claim 12 wherein said transfer magnet is spaced from said pick-up magnet to define a second gap in said magnetic field upstream of said first mentioned gap, and further including means connected to said transfer magnet and operative to move said transfer magnet toward and away from said pick-up magnet to vary the size of said second gap.

* * * * *

UNITED STATES PATENT OFFICE
CERTIFICATE OF CORRECTION

Patent No. 3,935,947                      Dated February 3, 1976

Inventor(s) William T. Barrett

It is certified that error appears in the above-identified patent and that said Letters Patent are hereby corrected as shown below:

In Column 8:

line 21, "of" should be --in--;

line 34, between "and" and "again", --are-- should be inserted;

line 45, between "first" and "generating", --field-- should be inserted.

In Column 9:

line 62, between "that" and "magnetic", --the-- should be deleted.

In Column 10:

line 23, "extention" should be --extension--;

line 44, "and" before "cleats" should be --said--.

In Column 12:

line 13, "dishcarge" should be --discharge--.

Signed and Sealed this first Day of June 1976

[SEAL]

Attest:

RUTH C. MASON
Attesting Officer

C. MARSHALL DANN
Commissioner of Patents and Trademarks